United States Patent
Parker

(10) Patent No.: US 11,329,666 B2
(45) Date of Patent: May 10, 2022

(54) METHOD AND SYSTEM FOR COMPRESSING AND/OR ENCRYPTING DATA FILES

(71) Applicant: PACBYTE SOFTWARE PTY LTD, North Epping (AU)

(72) Inventor: Bruce Parker, Mt. Colah (AU)

(73) Assignee: Pacbyte Solutions Pty Ltd, North Epping (AU)

( * ) Notice: Subject to any disclaimer, the term of this patent is extended or adjusted under 35 U.S.C. 154(b) by 0 days.

(21) Appl. No.: 16/339,352

(22) PCT Filed: Oct. 3, 2016

(86) PCT No.: PCT/IB2016/055897
§ 371 (c)(1),
(2) Date: Apr. 3, 2019

(87) PCT Pub. No.: WO2017/056073
PCT Pub. Date: Apr. 6, 2017

(65) Prior Publication Data
US 2020/0014399 A1    Jan. 9, 2020

(51) Int. Cl.
G06F 16/174      (2019.01)
H03M 7/40        (2006.01)
(Continued)

(52) U.S. Cl.
CPC ............. *H03M 7/40* (2013.01); *G06F 16/116* (2019.01); *G06F 16/13* (2019.01); *G06F 16/1744* (2019.01); *H04L 63/0428* (2013.01)

(58) Field of Classification Search
CPC .......................... H03M 7/40; G06F 16/1744
See application file for complete search history.

(56) References Cited

U.S. PATENT DOCUMENTS 6,438,556 B1 * 8/2002 Malik ................. G06F 16/9014
                                                 348/384.1
6,961,927 B1   11/2005 Erb et al.
(Continued)

FOREIGN PATENT DOCUMENTS

EP    2 706 466      3/2014
WO    2017/056073    4/2017

OTHER PUBLICATIONS

International Preliminary Report on Patentability dated Feb. 7, 2018, in International Patent Application No. PCT/IB2016/055897, 19 pages.

(Continued)

*Primary Examiner* — Hau H Hoang
(74) *Attorney, Agent, or Firm* — Ellen M. Bierman; Lowe Graham Jones LLC

(57) ABSTRACT

A method of transforming a data file, the method executed by a processor. The method includes segmenting the data file into data segments and creating a bit index for each data segment having a size that is based on a configurable or preset data group unit. The method then involves indexing each data segment into its corresponding bit index by reading all data group unit values within the data segment and updating the bit index based on the read values, and generating an output data file or files comprising the bit indexes that represent the original data file.

21 Claims, 2 Drawing Sheets

(51) Int. Cl.
    *G06F 16/11*          (2019.01)
    *G06F 16/13*          (2019.01)
    *H04L 29/06*         (2006.01)

(56) References Cited

U.S. PATENT DOCUMENTS

| | | |
|---|---|---|
| 7,340,103 B2 | 3/2008 | Smirnov |
| 2006/0244639 A1 | 11/2006 | Parker |
| 2010/0313036 A1 | 12/2010 | Lumb |
| 2011/0016136 A1* | 1/2011 | Isaacson .............. G06F 16/285 |
| | | 707/756 |

OTHER PUBLICATIONS

International Search Report and Written Opinion of the International Searching Authority dated Jan. 3, 2017, in International Patent Application No. PCT/IB2016/055897, 10 pages.

Written Opinion of the International Preliminary Examining Authority dated Oct. 17, 2017, in International Patent Application No. PCT/IB2016/055897, 5 pages.

Richardson, Douglas Ryan, Huffman Encoder/Decoder, retrieved from the Internet on Apr. 19, 2021, at https://github.com/drichardson/huffman, 6 pages.

SubhamastanRao, T. et al., "Simultaneous Data Compression and Encryption," Int'l J. Computer Science and Information Technologies, vol. 2 (5), 2011, pp. 2369-2374, retrieved from the Internet on Dec. 22, 2016, at http://citeseerx.ist.psu.edu/viewdoc/download?doi=10.1.1.227.9906&rep=rep1&type=pdf>, 6 pages.

\* cited by examiner

METHOD AND SYSTEM FOR COMPRESSING AND/OR ENCRYPTING DATA FILES

CROSS-REFERENCE TO RELATED APPLICATION

This application is a U.S. national phase of International Patent Application No. PCT/IB2016/055897, filed Oct. 3, 2016, the contents of which application is incorporated herein by reference in its entirety.

FIELD OF THE INVENTION

This invention relates to a method and system for the compression and/or encryption of data files for transmission over a data network, or storage. In particular, although not exclusively, the method and system relates to compressing and/or encrypting audio and/or video data files for streaming to an electronic device over a data network.

BACKGROUND TO THE INVENTION

Data files are transmitted over the internet or other data networks, or they are stored on local or remote devices.

These data files may be compressed using various compression software applications or algorithms like WinZip, RAR, or PPMD etc. Compression may be of a whole data file, or segments of a data file.

These data files may also be encrypted, be they compressed or not, for both storage and transmission over a data network. There are various forms of encryption and methods of encrypting, which include Digital Rights Management for video content and 128 and 256 bit encryption.

Decompression and decrypting requires a "key" which in the case of compression is an algorithm within a software application, and for encryption either a public key or a private key.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

It is an object of this invention to provide an improved method of compressing and/or encrypting data files, or to at least provide the public with a useful choice.

In a first aspect, the invention broadly consists in a method of transforming a data file, the method executed by a processor and comprising: segmenting the data file into data segments; creating a bit index for each data segment having a size that is based on a configurable or preset data group unit; indexing each data segment into its corresponding bit index by reading all data group unit values within the data segment and updating the bit index based on the read values; and generating an output data file or files comprising the bit indexes that represent the original data file.

In an embodiment, the method may further comprise processing the bit index for each data segment to generate a count value for each data segment representing the number of unique data group unit values in the data segment.

In an embodiment, the method may further comprise selectively applying Huffman or similar indexing to one or more of the data segments depending on their respective count values to generate one or more Huffman or similar indexes for one or more of the data segments.

In an embodiment, the method may further comprise selectively applying Huffman or similar indexing to one or more of the data segments if their respective count values indicate that the application of Huffman or similar indexing will be effective in generating an output data file comprising the bit indexes in combination with the Huffman or similar indexes that are smaller or compressed relative to the original data file.

In an embodiment, the method may further comprise determining the effectiveness of applying Huffman or similar indexing is based on whether the count values of the bit indexes representing the data segments fall within a predetermined range.

In an embodiment, the method may further comprise applying Huffman or similar indexing to one or more of the data segments based on their respective count value to generate Huffman or similar indexes.

In an embodiment, the method may comprise generating an output data file comprising the bit indexes and the Huffman or similar indexes that collectively represent the original data file.

In an embodiment, the data group unit may be a byte-group value comprising a designated number of bytes.

In an embodiment, the data group unit may be a byte-group value comprising at least 2-bytes. In one configuration, each data group unit may comprise groups of consecutive bytes. In another configuration, each data group unit may comprise groups of non-consecutive bytes.

In an embodiment, the data group unit may be set as 2-byte values.

In an embodiment, the size of the bit index for each data segment may be a function of the number of bytes that define each data group unit.

In an embodiment, the size of the bit index for each data segment corresponds to or is calculated as $256^n$ bits, where n corresponds to the number of bytes in each data group unit.

In an embodiment, the data group unit may be a bit-group value comprising a designated number of bits.

In an embodiment, the data group unit may be a bit-group value comprising at least 8-bits. In one configuration, each bit-group value may comprise groups of consecutive bits. In another configuration, each bit-group value may comprise groups of non-consecutive bits.

In an embodiment, the data group unit is set as a bit-group value of 8-bits.

In an embodiment, the size of the bit index for each data segment may be a function of the number of bits that define each bit-group value.

In an embodiment, the size of the bit index for each data segment corresponds to or is calculated as $2^n$ bits, where n is the number of bits in the bit-group value.

In an embodiment, indexing each data segment may comprise extracting all data group unit values from the data segment, and updating the bit index to register each unique data group unit value identified.

In an embodiment, each unique data group unit value has a corresponding representative bit in the bit index, and wherein the value of the representative bit represents whether the data group unit value is present or not in the data segment.

In an embodiment, the offset position of each bit in the bit index corresponds or is associated to the unique data group unit value that the bit represents.

In an embodiment, segmenting the data file may comprise segmenting the data file into uniformly sized data segments.

In an embodiment, segmenting the data file may comprise segmenting the data file into data segments that have a size that is a function of the number of bits or bytes defining the data group units.

In an embodiment, segmenting the data file may comprise segmenting the data file into data segments that each have a size that is based on the total possible number of unique values representable by the data group unit and the number of bits or bytes defining the data group units.

In an embodiment, segmenting the data file may comprise segmenting the data file into data segments that each have a size that is sufficient to contain all possible unique values representable by the data group unit.

In an embodiment, segmenting the data file may comprise segmenting the date file into at least some differently sized data segments.

In an embodiment, the data file is itself a data segment of a larger data file.

In an embodiment, the generated output data file is a compressed version of the original data file.

In an embodiment, the generated output data file is not a compressed version of the original data file.

In an embodiment, the generated output data file is an encrypted version of the original data file.

In an embodiment, the bit index for each data segment is predetermined.

In an embodiment, the bit index for each data segment is randomly generated.

In a second aspect, the invention broadly consists in an electronic device for transforming a data file, the electronic device comprising: a processor; and memory; and wherein the processor is configured to execute the method of the first aspect of the invention.

In a third aspect, the invention broadly consists in a computer-readable medium having stored thereon computer executable instructions that, when executed on a processing device or devices, cause the processing device or devices to perform a method of the first aspect of the invention.

Each aspect of the invention above may have any one or more of the features mentioned in respect of the other aspects of the invention above.

Definitions or Terms or Phrases

The term 'comprising' as used in this specification and claims means "consisting at least in part of". When interpreting each statement in this specification and claims that includes the term 'comprising', features other than that or those prefaced by the term may also be present. Related terms such as 'comprise' and 'comprises' are to be interpreted in the same manner.

The phrase 'computer-readable medium' should be taken to include a single medium or multiple media. Examples of multiple media include a centralised or distributed database and/or associated caches. These multiple media store the one or more sets of computer executable instructions. The phrase 'computer readable medium' should also be taken to include any medium that is capable of storing, encoding or carrying a set of instructions for execution by a processor of a computing device and that cause the processor to perform any one or more of the methods described herein. The computer-readable medium is also capable of storing, encoding or carrying data structures used by or associated with these sets of instructions. The phrase 'computer-readable medium' includes solid-state memories, optical media and magnetic media.

Number Ranges

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both.

As used herein "(s)" following a noun means the plural and/or singular forms of the noun.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION

Figure 1:
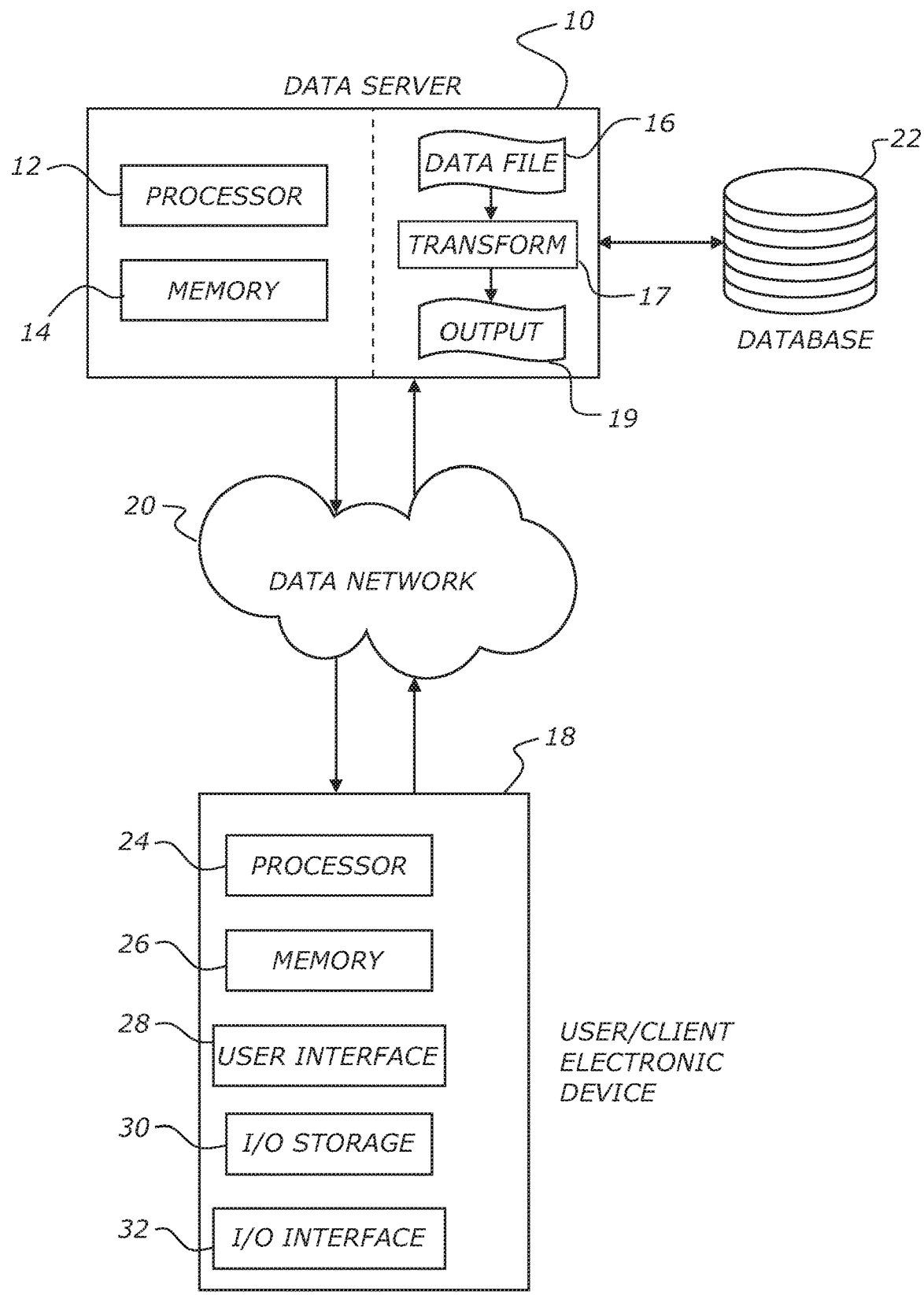
FIG. 1 is a schematic diagram of an overview of an example system configuration of in accordance with an embodiment of the invention.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

Aspects of the systems and methods described below may be operable on any type of general purpose computer system or computing device, including, but not limited to, a desktop, laptop, notebook, tablet, smart television, or mobile device. The term "mobile device" includes, but is not limited to, a wireless device, a mobile phone, a smart phone, a mobile communication device, a user communication device, personal digital assistant, mobile hand-held computer, a laptop computer, wearable electronic devices such as smart watches and head-mounted devices, an electronic book reader and reading devices capable of reading electronic contents and/or other types of mobile devices typically carried by individuals and/or having some form of communication capabilities (e.g., wireless, infrared, short-range radio, cellular etc.).

1. Overview of System Configuration and Method Process

The system and method is configured to transform a data file or files for transmission across a data network between one device or system to another, or for data storage. The transformation may result in compression and/or encryption.

In one configuration, the system and method may be performed on a data server that is configured to transmit or stream data files to remote client or user electronic devices. In another configuration the system and method may be performed on a client or user electronic device that is configured or operable to transmit or upload data files to a data server for storage or to another client or user device in a peer-to-peer network file sharing configuration. It will be appreciated that the system and method may be performed on any electronic device or system that is operable to send, transmit, or stream data files to another device or system over a data network, or which is used for data storage.

Referring to FIG. 1, an example configuration of the system and method operating in a data server 10 will be explained. The data server 10 may typically comprise a processor 12 and memory 14, and is configured to stream or transmit data files 16 to a client or user electronic device 18 over a data network 20 via one or more data streams or threads, either at the request of the user device or the data server may actively push the data files to the user device without request. The data server 10 may be operatively connected to or in data communication with a database 22 comprising data files that the user device may browse and select for download or streaming.

The data network 20 may typically be the internet for example, but may also be another other data or communication network or combination of networks that form a data communication link, including intranets, extranets, cellular data networks such as 3G and 4G, direct wireless connections such as WiFi, Bluetooth, infrared, Near-field communication (NFC), or any other single or combination of wired and/or wireless data communication links or networks.

The user electronic device 18 may be any form of programmable electronic device such as, but not limited to, a computer, tablet, smart phone, smart television, or the like. The user electronic device 10 typically comprises hardware components such as, but not limited to, a processor 24, memory 26, user interface 28, input/output (I/O) storage component 30, and I/O interface 32. By way of example, the processor 24 may be any form of a CPU, microprocessor, microcontroller, Field Programmable Gate Array (FPGA), Application Specific Integrated Circuit (ASIC) or the like. The memory 26 typically comprises Random Access Memory (RAM) and/or memory onboard the processor. The I/O storage component 30 may, for example, comprise any one or more of a Hard Disk Drive (HDD), Solid State Drive (SSD), or Flash drive. The I/O interface 32 may typically comprises any one or more components for enabling the device to connect or communicate with other devices or data networks, such as a communications module or module, wireless connection modules for cellular data connections such as 3G or 4G, WiFi, Bluetooth, NFC or the like, wired ports or connectors such as USB ports, Ethernet ports, parallel and serial ports. The user interface 28 may vary depending on the user electronic device 18, but comprises devices or components that enable the user to interact, operate or control the user device, and may typically comprise any one or more of a display or touch-screen display, keyboard, mouse, touch pad or ball, audio output and input such as speakers and microphone.

In this embodiment, the data sever is configured to apply a transformation process 17 to the data file 16 or a segment or segments of the data file, and generate a compressed and/or encrypted output data file or files for transmission over a data network 20 or storage in the database 22 for example.

In this embodiment, the transformation process comprises segmenting a data file into data segments of a predetermined size, for example typically designated as a number of bytes. Then applying the transformation process to each individual data segment. The transformation process comprises designating or setting a configurable data group unit upon which the transformation is based. The data group unit may be designated as either a number of bytes, e.g. byte-groups such as 2 bytes, 3 bytes, or a number of bits, e.g. bit groups such as 8-bit groups, 9-bit groups or higher, or any other suitable byte or bit groups. A bit index file is then created for each data segment to be processed, or alternatively a single bit index file is created that comprises multiple bit index segments, each corresponding to a respective data segment of the original data file.

The bit index file, or segment of a single bit index file, corresponding to each data segment has a size that is designated by or a function of the configured data group unit. In particular, the bit index has an index value corresponding to each possible unique value derivable from a data group unit. For example, if the data group unit is set to 2-byte groups, then the data group unit values may be anything from 0 to 65535, and therefore the bit index size is set to 65536 bits. Each data group unit value is represented by a respective bit in the bit index having an offset position in the index corresponding to the data group unit value. For example, 2-byte value 0 is represented by the $1^{st}$ bit in the bit index, and 2-byte value 8 is represented by the $9^{th}$ bit in the bit index, etc. All bits in the bit index are originally set to 0, in this embodiment.

Each data segment is processed and the data group unit values are extracted sequentially. For example, the value of each consecutive 2-byte value (data group unit) in the data segment is calculated or read, and its corresponding bit value in the bit index is changed from 0 to 1, representing that the 2-byte value is present in the data segment.

Once the entire data segment has been processed, a count of the unique data group unit values in the data segment is generated, e.g. based on the number of 1 bits in the bit index. This process is repeated for all remaining data segments, and corresponding bit index segments and unique value counts are generated for each data segment.

Once all the data segments in the data file have been processed, Huffman indexing is applied to each data segment using the respective unique value counts for each data segment. For example, for each data segment, each unique value within the data segment is assigned a Huffman value either randomly, or based on a predetermined structure.

The Huffman indexing data is then combined with the bit index file to generate a single output file or a number of data files that represent the original data file.

It will be appreciated that in alternative embodiments other similar indexing or coding techniques to Huffman may alternatively be used.

Setting the Data Segment Size

In an embodiment, the segmenting of the original data file into data segments for processing in the method involves segmenting the data file into uniformly sized data segments. However, in alternative embodiments, the data segments may be non-uniformly sized.

In an embodiment, segmenting the data file comprises segmenting the data file into data segments that have a size that is a function of or based on the number of bits or bytes defining the configurable data group units. In one example, segmenting the data file comprises segmenting the data file into data segments that each have a size that is based on the total possible number of unique values representable by the data group unit and the number of bits or bytes defining the data group units. In another example, segmenting the data file comprises segmenting the data file into data segments that each have a size that is sufficient to contain all possible unique values representable by the data group unit.

Setting the Bit Index Size for Each Data Segment

In one embodiment, the data group unit is a byte-group value comprising a designated number of bytes, which is typically groups of consecutive bytes, but may alternatively be groups of non-consecutive bytes. In an embodiment, the size of the bit index for each data segment is a function of the number of bytes that define each data group unit. For example, the size of the bit index for each data segment corresponds to or is calculated as $256^n$ bits, where n corresponds to the number of bytes in each data group unit.

In another embodiment, the data group unit is a bit-group value comprising a designated number of bits, which is typically groups of consecutive bits, but may alternatively be groups of non-consecutive bits. In an embodiment, the size of the bit index for each data segment is a function of the number of bits that define each bit-group value. For example, the size of the bit index for each data segment corresponds to or is calculated as $2^n$ bits, where n is the number of bits in the bit-group value.

Decision on Applying Huffman or Similar Indexing

In an embodiment, the method involves selectively applying Huffman or similar indexing to one or more of the data segments depending on their respective count values to generate one or more Huffman or similar indexes for one or more of the data segments. For example, Huffman or similar indexing is applied to one or more of the data segments if their respective count values indicate that the application of Huffman or similar indexing will be effective in generating an output data file comprising the bit indexes in combination with the Huffman or similar indexes that are smaller or compressed relative to the original data file. In one configuration, determining the effectiveness of applying Huffman or similar indexing is based on whether the count values of the bit indexes representing the data segments fall within a predetermined range.

2. Example—Transformation Applied to 2-Byte Groups

Figure 2:
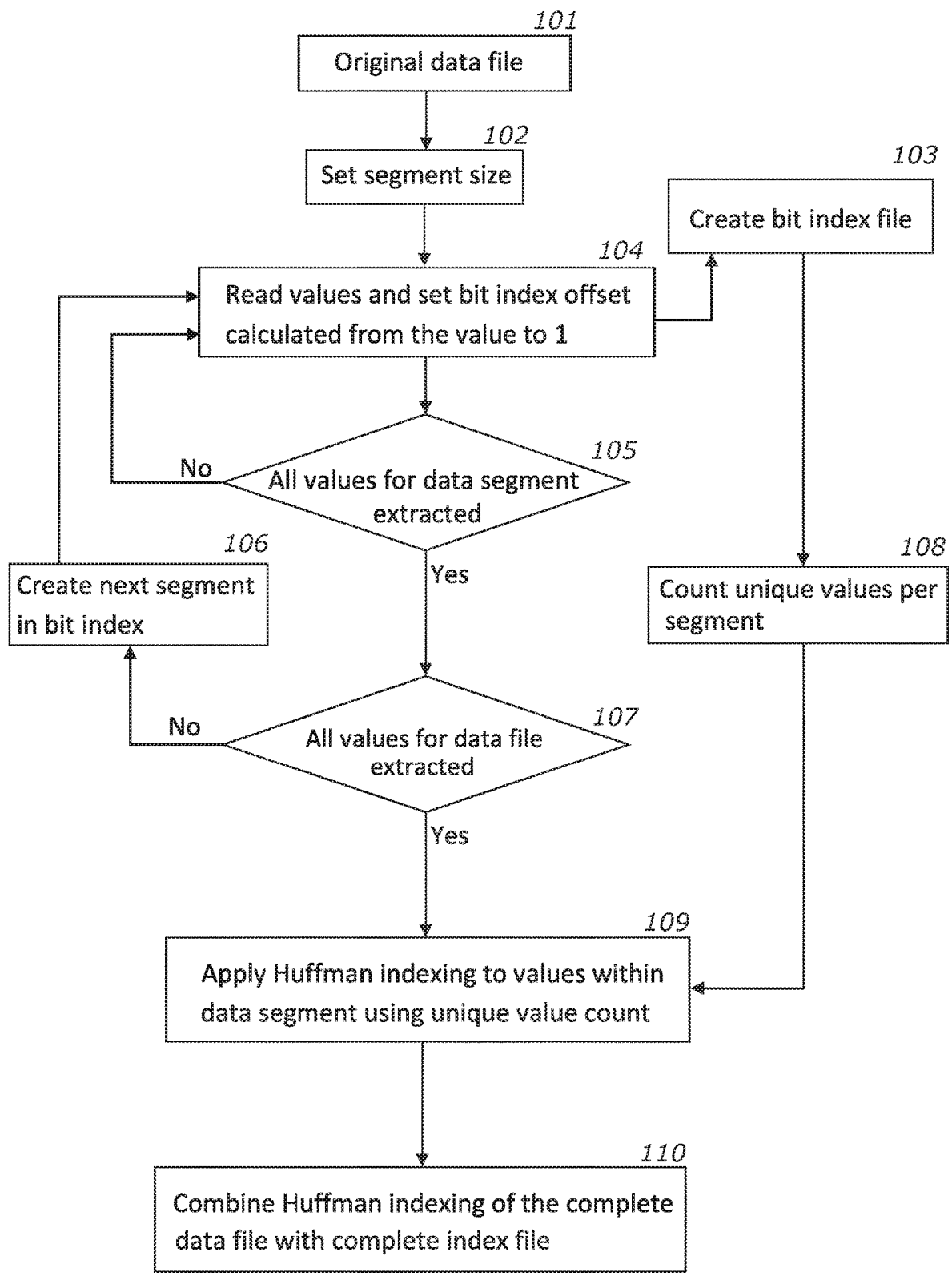
FIG. 2 is a flow diagram showing an example of an implementation of main process steps for compressing and/or encrypting a data file in accordance with an embodiment of the invention.

An example embodiment will be described with reference to FIG. 2 in which the data group unit is configured to be 2-byte values, i.e. a 2-byte compression structure.

In one preferred form the process may be used for the compression of data files with a level of compression already applied to the data file.

Huffman indexing allows for creating a bit structure not necessarily based on a binary structure. Using a standard binary bit structure three (3) values would be seen as 00, 01 and 10, whereas with Huffman the same 3 values would be 0, 10 and 11.

When looking at the distribution of unique byte values within a set group of bytes, when compressed, there is an averaging of the number of unique values. In the case of a group of 256 bytes compressed using a standard compression tool, there are usually between 152 and 172 unique values, with a number of these values repeated. This is due to the fact that the most commonly occurring number of unique values within all possible combinations of 256 bytes is 162, which accounts for 8.9% of all possible 256 byte values within 256 bytes. The more efficient compression algorithms approach 162 unique values per 256 byte segment.

In a similar way, for 2-byte groups, in a group of 65,536 bytes, 39,202 is the most commonly occurring number of unique values within all possible combinations of 65,536 bytes.

To enable an efficient use of Huffman indexing, the order of the byte values by frequency should be maintained in a separate index. Use of an index like this for a 256 byte segment, will almost double the size of the segment, so it is not a practical method. Creating an index with simply the values occurring in a 256 byte segment, will increase the size of a 256 byte segment by about 162 bytes, and the Huffman indexing will not be as effective. If the index is structured as a bit index where 256 bits (32 bytes) are used with the first bit representing 0, the second bit 1 etc to the $256^{th}$ bit representing 255, then the increase in size will be reduced. The index itself may be compressed using a standard algorithm. The net result would be an increase in the size of the 256 byte segment.

For 2-byte data groups, compression using the latter structure is possible. For a 2-byte data group, there are 65,536 possible values in 2 bytes i.e. $2^{16}$ (16 bits in two bytes). The minimum number of bytes required to have all 65,536 values represented in a data segment is 131,072 bytes (i.e. this is set as the data segment size). If a 1 MB segment of a data file (101) is broken into eight (8) 131,072 byte sub segments (102), there will be in the order of 39,202 unique values in each of those sub segments.

Using Huffman indexing and assuming an even spread of the values, each value on average would require 15.3282 bits. To index the 39,202 values, a bit index is employed. The bit index is 65,536 bits (8,192 bytes) in size, corresponding to the number of possible unique 2-byte values in the data segment.

Upon creation of a bit index file (103) for the data segment, all bit values in the index will be 0. The first or relevant 131,072 data segment is then opened. The value of the first 16 bits or 2 bytes of the data segment are calculated and will be between 0 and 65,535 (104). The bit offset within the index file that corresponds to this value is set to 1. This process is repeated until all 16 bit values have been indexed (105). By way of further example, if the value for the first two bytes is for example 12,345 then the bit offset 12,345 within the index file is changed from 0 to 1. If the value for the third and fourth bytes (second pair of bytes) is 0 then the bit offset 0 is changed to a 1 in the index file, and so on. If there is a repeat of a value with two bytes, then the relevant offset within the index file will have already been changed from a 0 to 1 from the earlier occurrence, so no change is made to the bit index file.

Once the processing of the 131,072 byte data segment has been completed, the bit index file for that data segment is complete, and a new bit index file is created for the next 131,072 byte segment, and this process continues until all data segments in the data file have been processed (107).

Once this process is complete, a count of the number of unique 16 bit or 2 byte values is made (108) for each data segment. These count values are used to determine if any compression is achievable using Huffman indexing (109).

In one configuration, determining the effectiveness of applying Huffman or similar indexing is based on whether the count values of the bit indexes representing the data segments fall within a predetermined range. In this embodiment, by way of example only, the predetermined range may be set as approximately 37000 unique values to approximately 41000 unique values, for a 131,072 byte data segment. By way of example, if a data segment has an associated bit index representing a unique byte value count for the data segment in this range, then Huffman indexing is applied.

If compression is possible, then Huffman indexing is applied to the data segments, and the Huffman indexes and the bit indexes are combined as a single output file (110) representing the original data file.

Example Analysis for the Application of the Above Transformation Process

Whilst it is mathematically possible for all 65,536 values to occur within a 131,072 byte segment, the probability is very close to zero. The most commonly occurring structure is 39,202 unique values with up to 26,334 values repeating at least once. In reality it is more likely to be 39,202 unique values and approximately 10,000 values being repeated once, twice or more.

The bit index file, now contains the two byte values held within a 131,072 byte segment, not in order, or the number of repeats. A simple count of the number of 1 value bits within the bit index file, tells us how many unique values there are within the 131,072 segment. If this value is 39,202, then using a standard Huffman tree, 15.3282 bits are required to represent 0 to 39,201.

The bit index file has 39,202 values. If for example in the bit index table the $39,202^{th}$ 1 bit is at offset 62,345, then the value represented by the Huffman 39,202 is 62,345 or first byte value of 243 and second byte value of 137 in the last pair of byte values.

With 39,202 values, then the 131,072 segment size will be: 8,192 bytes (bit index) and 15.3282 bits×65,536 (pairings)=1,004,549 bits=125,569 bytes. Total output data file size is 133,761 bytes, or an increase in size of 2,689 bytes. If there are less than 39,202 unique values, then the final file size will be smaller.

If the bit index is used over two 131,072 segments, then the number of unique 65,536 values will increase to approximately 56,758. Using a Huffman tree 56,758 values can be represented using an average of 15.8453 bits. The bit index file will now have 56,758 1 value bits. As there is an increase in the number of 1 values and subsequent drop in the number of 0 values (56,758 1's and 8,778 0's) the bit index file can now be compressed using Zip, PPMD or similar to approximately 2 KB. This then gives a total output data file size of: 2,000 bytes (compressed bit index) and 15.8453×131,072 (pairings)=2,076,876 bits=259,609 bytes. Total output data file size is 261,609 bytes or a decrease in size of 535 bytes.

It is possible when implementing this method that there will be no compression, or the data segment may expand. However in either case, the data segment will have had a further level of encryption applied to it.

3. Summary

In summary, the system and method provides a method of compressing and/or encrypting a data file or data file segment transmitted over a data network, or for data storage. The method comprises the steps of indexing data group units (e.g. 2-byte values) and through the use Huffman indexing, compression may be obtained, and the data file or data segment will be encrypted as part of the process.

In one example, the system and method comprises a method of indexing all 2-byte values within a data file or segment of a data file into a bit file index. The unique values identified are assigned a Huffman value either randomly, or based on a predetermined structure. The Huffman index and bit file index are then combined into a single output file representing the original data file.

In one form, the method and system can be used to generate additional compression of already compressed files will be gained.

In another form, the method and system can be used to encrypt a data file or data file segment, and in addition a level of compression or expansion may occur.

4. General

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the invention. Additional elements or components may also be added without departing from the invention. Additionally, the features described herein may be implemented in software, hardware, as a business method, and/or combination thereof.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the invention includes preferred forms thereof. Modifications may be made thereto without departing from the scope of the invention as defined by the accompanying claims.

What is claimed is:

1. A method of transforming a data file, the method executed by a processor and comprising:
   segmenting the data file into data segments;
   creating a bit index for each data segment having a size that is based on a configurable or preset data group unit, wherein each value in the bit index is either a "0" or a "1" to indicate a bit is not set or set;
   indexing each data segment into its corresponding bit index by reading all data group unit values within the data segment and updating the bit index based on the read values by extracting all data group unit values from the data segment, and updating the bit index to register each unique data group unit value identified, wherein each unique data group unit value has a single corresponding representative bit in the bit index, and the value of the representative bit represents whether the data group unit value is present or not in the data segment based upon whether the value of the representative bit is set, and wherein the offset position of each bit in the bit index corresponds to the unique data group unit value that the bit represents; and
   generating an output data file or files comprising the bit indexes that represent the original data file.

2. A method according to claim 1 further comprising processing the bit index for each data segment to generate a count value for each data segment representing the number of unique data group unit values in the data segment.

3. A method according to claim 2 comprising selectively applying Huffman or similar indexing to one or more of the data segments depending on their respective count values to generate one or more Huffman or similar indexes for one or more of the data segments.

4. A method according to claim 3 comprising selectively applying Huffman or similar indexing to one or more of the data segments if it is determined that their respective count values indicate that the application of Huffman or similar indexing will be effective in generating an output data file comprising the bit indexes in combination with the Huffman or similar indexes that are smaller or compressed relative to the original data file, and wherein determining the effectiveness of applying Huffman or similar indexing is based on whether the count values of the bit indexes representing the data segments fall within a predetermined range.

5. A method according to claim 2 comprising applying Huffman or similar indexing to one or more of the data segments based on their respective count value to generate Huffman or similar indexes.

6. A method according to claim 3 comprising generating an output data file comprising the bit indexes and the Huffman or similar indexes that collectively represent the original data file.

7. A method according to claim 1 wherein the data group unit is a byte-group value comprising a designated number of bytes.

8. A method according to claim 7 wherein each data group unit comprises groups of consecutive bytes, or wherein each data group unit comprises groups of non-consecutive bytes.

9. A method according to claim 7 wherein the data group unit is set as 2-byte values.

10. A method according to claim 7 wherein the size of the bit index for each data segment is a function of the number of bytes that define each data group unit.

11. A method according to claim 7 wherein the size of the bit index for each data segment corresponds to or is calculated as $256n$ bits, where n corresponds to the number of bytes in each data group unit.

12. A method according to claim 1 wherein the data group unit is a bit-group value comprising a designated number of bits.

13. A method according to claim 12 wherein each bit-group value comprises groups of consecutive bits, or wherein each bit-group value comprises groups of non-consecutive bits.

14. A method according to claim 12 wherein the data group unit is set as a bit-group value of 8-bits.

15. A method according to claim 12 wherein the size of the bit index for each data segment is a function of the number of bits that define each bit-group value.

16. A method according to claim 12 wherein the size of the bit index for each data segment corresponds to or is calculated as $2n$ bits, where n is the number of bits in the bit-group value.

17. A method according to claim 1 wherein segmenting the data file comprises segmenting the data file into data segments that have a size that is a function of the number of bits or bytes defining the data group units.

18. A method according to claim 1 wherein segmenting the data file comprises segmenting the data file into data segments that each have a size that is based on the total number of unique values representable by the data group unit and the number of bits or bytes defining the data group units.

19. A method according to claim 1 wherein segmenting the data file comprises segmenting the data file into data segments that each have a size that is sufficient to contain all unique values representable by the data group unit.

20. An electronic device for transforming a data file, the electronic device comprising:
   a processor;
   memory; and
   the processor configured to perform a method comprising:
      segmenting the data file into data segments;

creating a bit index for each data segment having a size that is based on a configurable or preset data group unit, wherein each value in the bit index is either a "0" or a "1" to indicate a bit is not set or set;

indexing each data segment into its corresponding bit index by reading all data group unit values within the data segment and updating the bit index based on the read values by extracting all data group unit values from the data segment, and updating the bit index to register each unique data group unit value identified, wherein each unique data group unit value has a single corresponding representative bit in the bit index, and the value of the representative bit represents whether the data group unit value is present or not in the data segment based upon whether the value of the representative bit is set, and wherein the offset position of each bit in the bit index corresponds to the unique data group unit value that the bit represents; and generating an output data file or files comprising the bit indexes that represent the original data file.

21. A non-transitory computer-readable medium having stored thereon computer executable instructions that, when executed on a processing device or devices, cause the processing device or devices to perform a method by:

segmenting the data file into data segments;

creating a bit index for each data segment having a size that is based on a configurable or preset data group unit, wherein each value in the bit index is either a "0" or a "1" to indicate a bit is not set or set;

indexing each data segment into its corresponding bit index by reading all data group unit values within the data segment and updating the bit index based on the read values by extracting all data group unit values from the data segment, and updating the bit index to register each unique data group unit value identified, wherein each unique data group unit value has a single corresponding representative bit in the bit index, and the value of the representative bit represents whether the data group unit value is present or not in the data segment based upon whether the value of the representative bit is set, and wherein the offset position of each bit in the bit index corresponds to the unique data group unit value that the bit represents; and generating an output data file or files comprising the bit indexes that represent the original data file.

\* \* \* \* \*